(12) United States Patent
Lord

(10) Patent No.: US 9,594,763 B2
(45) Date of Patent: Mar. 14, 2017

(54) N-WAY INODE TRANSLATION

(71) Applicant: Quantum Corporation, San Jose, CA (US)

(72) Inventor: Stephen Lord, Prior Lake, MN (US)

(73) Assignee: Quantum Corporation, San Jose, CA (US)

(*) Notice: Subject to any disclaimer, the term of this patent is extended or adjusted under 35 U.S.C. 154(b) by 281 days.

(21) Appl. No.: 14/263,480

(22) Filed: Apr. 28, 2014

(65) Prior Publication Data

US 2015/0310127 A1  Oct. 29, 2015

(51) Int. Cl.
*G06F 17/30* (2006.01)

(52) U.S. Cl.
CPC .................. *G06F 17/3012* (2013.01)

(58) Field of Classification Search
CPC ...... G06F 17/30041; G06F 17/300044; G06Q 30/06
USPC ....... 707/627, 821, 690, 639, 634, 823, 613, 707/705, 649, 830, 200
See application file for complete search history.

(56) References Cited

U.S. PATENT DOCUMENTS

| | | | | |
|---|---|---|---|---|
| 7,430,570 B1* | 9/2008 | Srinivasan | ........ | G06F 17/30094 |
| 7,657,796 B1* | 2/2010 | Kaiser | ................. | G06F 11/1435 |
| | | | | 707/821 |
| 2008/0320052 A1* | 12/2008 | Chandrachari | ... | G06F 17/30091 |
| 2012/0030265 A1* | 2/2012 | Anderson | ......... | G06F 17/30091 |
| | | | | 707/830 |
| 2012/0066182 A1* | 3/2012 | Chang | ............... | G06F 17/30088 |
| | | | | 707/639 |
| 2013/0325804 A1* | 12/2013 | Bachar | ............. | G06F 17/30215 |
| | | | | 707/634 |
| 2014/0258242 A1* | 9/2014 | Kanfi | ................ | G06F 17/30227 |
| | | | | 707/690 |
| 2015/0278244 A1* | 10/2015 | Shvachko | ......... | G06F 17/30174 |
| | | | | 707/634 |

\* cited by examiner

*Primary Examiner* — Jeffrey A Burke
*Assistant Examiner* — Thong Vu
(74) *Attorney, Agent, or Firm* — Eschweiler & Potashnik, LLC

(57) ABSTRACT

Example apparatus and methods concern storing additional information about inodes to facilitate n-way inode translation between local inode spaces and external inode spaces. Example apparatus and methods also concern publishing information about actions that affect inodes to facilitate n-way inode translation. Additional data is added to local file systems so that a local file system can determine whether an inode for which an action is requested or reported is a native inode or an imported inode. The additional data added to the local file systems through the updated inode data storage and inode action publication also facilitates determining which local inode to act on based on the n-way inode translation mechanism.

16 Claims, 10 Drawing Sheets

| Local Inode Number 210 | Native/Imported 220 | Mapping 230 |

N-WAY INODE TRANSLATION

BACKGROUND

File systems store files and store information about files. The information stored in files may be referred to as data. The information about files may be referred to as metadata. The metadata may include, for example, a file name, a file size, a file parent, a file descendant, a file access time, a file owner, file permissions, and other information. Some of the metadata for an individual file may be stored in a data structure known as an inode. The inodes and metadata for a file system may also be stored collectively. The metadata has both structure and content. When the data in a file or about a file changes, a file system may want to update the metadata about that file. For example, if the contents of a file are changed, the file system may want to memorialize the time at which the change was made and by whom the change was made. Actions on a file produce actions on a corresponding inode.

Inodes are local to a file system. They are a private resource of a file system. Thus, actions performed on a file in a file system produce actions on a corresponding inode associated with that individual file system. However, individual file systems acting in isolation are becoming more rare. Or, seen from another point of view, collections of file systems acting together are becoming more common. For example, in geo-spreading, files are spread across a system but stored in separate local file systems, where each file system has its own inodes. Although each file system has its own inodes, it may be desirable for a first file system to understand actions that were taken on files or inodes in a second file system.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods concern storing additional information about inodes to facilitate n-way inode translation between local inode spaces and external inode spaces. Example apparatus and methods also concern publishing information about actions that affect inodes to facilitate n-way inode translation. Intelligence is added to local file systems through the updated inode data storage and inode action publication so that a local file system can determine whether an inode for which an action is requested or reported is a native inode or an imported inode. The intelligence added to the local file systems through the updated inode data storage and inode action publication also facilitates determining which local inode to act on based on the n-way inode translation mechanism.

Example apparatus and methods publish information about internal inode actions to external file systems. Example apparatus and methods also maintain an inode mapping on a per file system basis so that an internal file system only has to manage its own inode space. Even though an internal file system only has to manage its own inode space, the internal file system may also have information (e.g., mappings) about inodes in an external file system through the mapping and publication procedures. A mapping may identify which inode in an external inode space corresponds to an inode in an internal inode space and which inode in an external inode space corresponds to an inode in an internal inode space.

Since file systems are communicating information about inodes, and since requests may be made or actions communicated about an inode that may or may not be local to a file system, when an internal file system receives an action request or information publication from an external file system, the internal file system may need to determine whether the inode is native to that file system or is native to another file system. If the inode is native to another file system, it may be referred to as being imported from that other file system. The internal file system may, therefore, use an extended inode to support an n-way inode translation between inode spaces so that the internal file system can understand relationships between inodes in its internal inode space and inodes in an external inode space.

Figure 1:
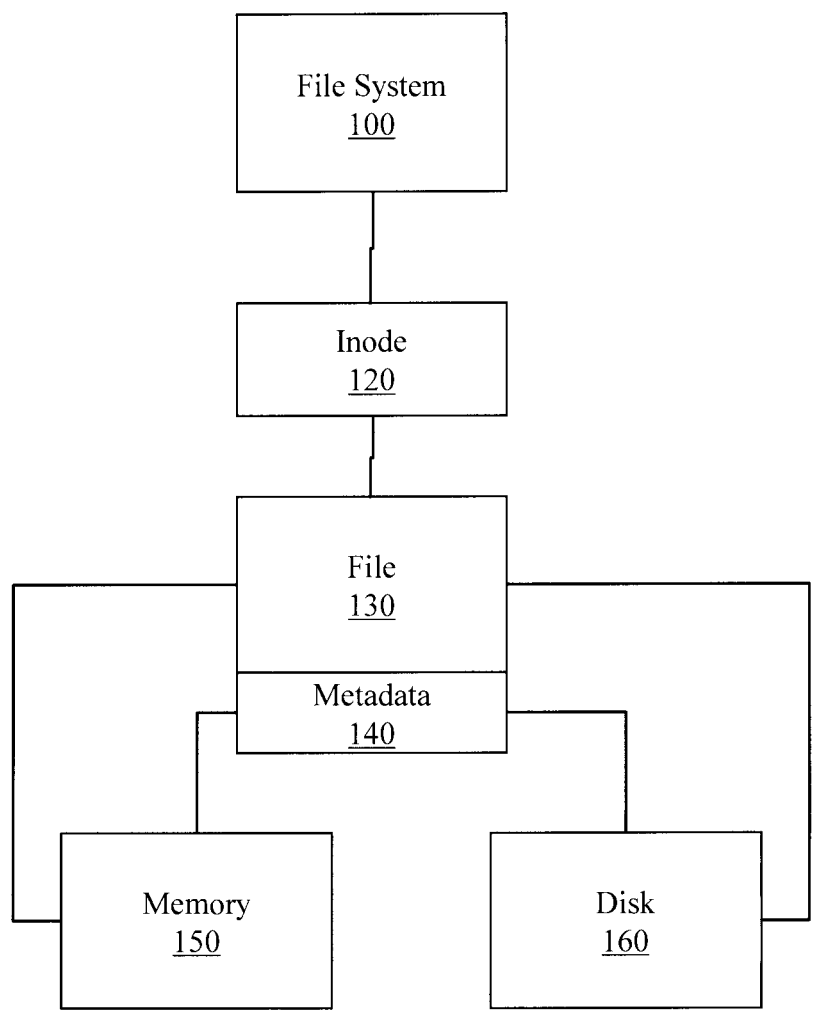
FIG. 1 illustrates a file system.
Figure 2:
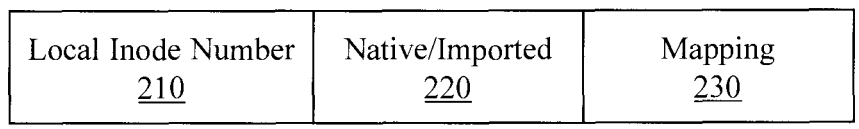
FIG. 2 illustrates an example record in an example inode table.

FIG. 2 illustrates an example inode record 200. In one embodiment, the extended inode 200 may include an internal file system inode number 210, a native/imported field 220, and a mapping 230. If the native/imported field 220 indicates that the inode is native to a file system, then that file system may not need to resolve a mapping to select an appropriate inode to touch. But if the native/imported field 220 indicates that the inode has been imported into the file system from another file system, then the file system may resolve a mapping to correctly identify the inode to touch.

Thus, example apparatus and methods maintain additional information for inodes in a local inode space, publish information about actions in the local inode space to external inode spaces, and receive information published about actions in external file systems. Publishing the information about actions in their local inode space facilitates external file systems establishing and maintaining mappings between local inode spaces and external inodes spaces. The additional information for inodes in a local inode space includes the mappings to inodes in the external inode space(s).

Figure one illustrates a file system 100. While a user may refer to a file 130 using a file name, the file system 100 may refer to the file 130 using an inode 120. When a change is made to the file 130, there may also be a change to the metadata 140 of the file. The metadata 140 may include, for example, the name of a file, the size of a file, the owner of a file, the most recent access time of a file, and other information. In some occurrences, the updated file 130 may be stored in memory 150. Similarly, in some occurrences, the updated metadata 140 may be stored in memory 150. Ultimately, the updated file 130 and the updated metadata 140 may be stored on disk 160. While there are changes that have been made only in memory 150, a journal may be used to protect those changes. In one embodiment, some of the metadata 140 for a file 130 may be stored in the inode 120 associated with the file. The inode 120 may also store association metadata (e.g., parent, child) for a file. The association metadata may describe, for example, a parent (e.g., directory) for a file or a descendant (e.g., sub-directory, file) for a directory. The inodes and metadata may be stored in data structures about the files. Thus, file system 100 may have both files and data structures about those files. Example apparatus and methods maintain additional data in or for an inode and communicate information about actions affecting a local inode. Maintaining the additional information and communicating the information about inode actions facilitates performing n-way translations for inodes where inodes in one inode space can be identified by a file system having a separate inode space.

Figure 3:
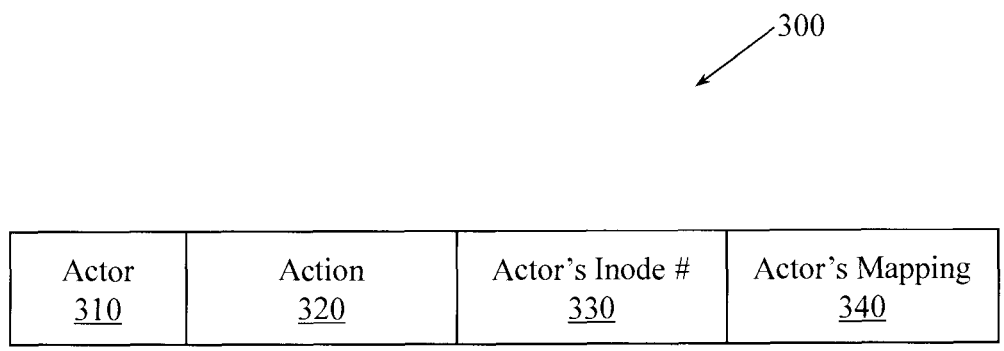
FIG. 3 illustrates an example publication concerning an action taken in a file system.

FIG. 3 illustrates an example inode publication data structure 300. The data structure 300 may be provided to communicate information about an action taken in a file system that affected an inode. The example data structure 300 includes four fields. In different examples, a greater or lesser number of fields may be employed and the fields may be arranged in different orders. In one embodiment, the data structure 300 includes an actor field 310. The actor field 310 may identify the file system that took the action, the local inode space that was acted upon, or other information that identifies the source of the data structure 300 or the entity that acted upon an inode. In different embodiments the actor field 310 may be a bitfield, a character string, an integer, or other data type suitable for computer storage and a computer communication.

In one embodiment, the data structure 300 may also include an action field 320. The action field 320 may identify what happened to an inode. For example, an inode may have been created, updated, deleted, or otherwise manipulated. In different embodiments the action field 320 may be a bitfield, a character string, an integer, or other data type suitable for computer storage and a computer communication.

In one embodiment, the data structure 300 may also include an actor's inode number field 330. The actor's inode number field 330 may identify the inode upon which the action identified in the action field 320 was applied by the actor identified in the actor field 310. When the action was taken on a native inode in an originating file system, the actor's inode number 330 may be the original inode number. When the action was taken on an imported inode that originated in an external file system, the actor's inode number 330 may not be the original inode number. In different embodiments, the actor's inode number field 330 may be a bitfield, a character string, an integer, or other data type suitable for computer storage and a computer communication.

Figure 4:
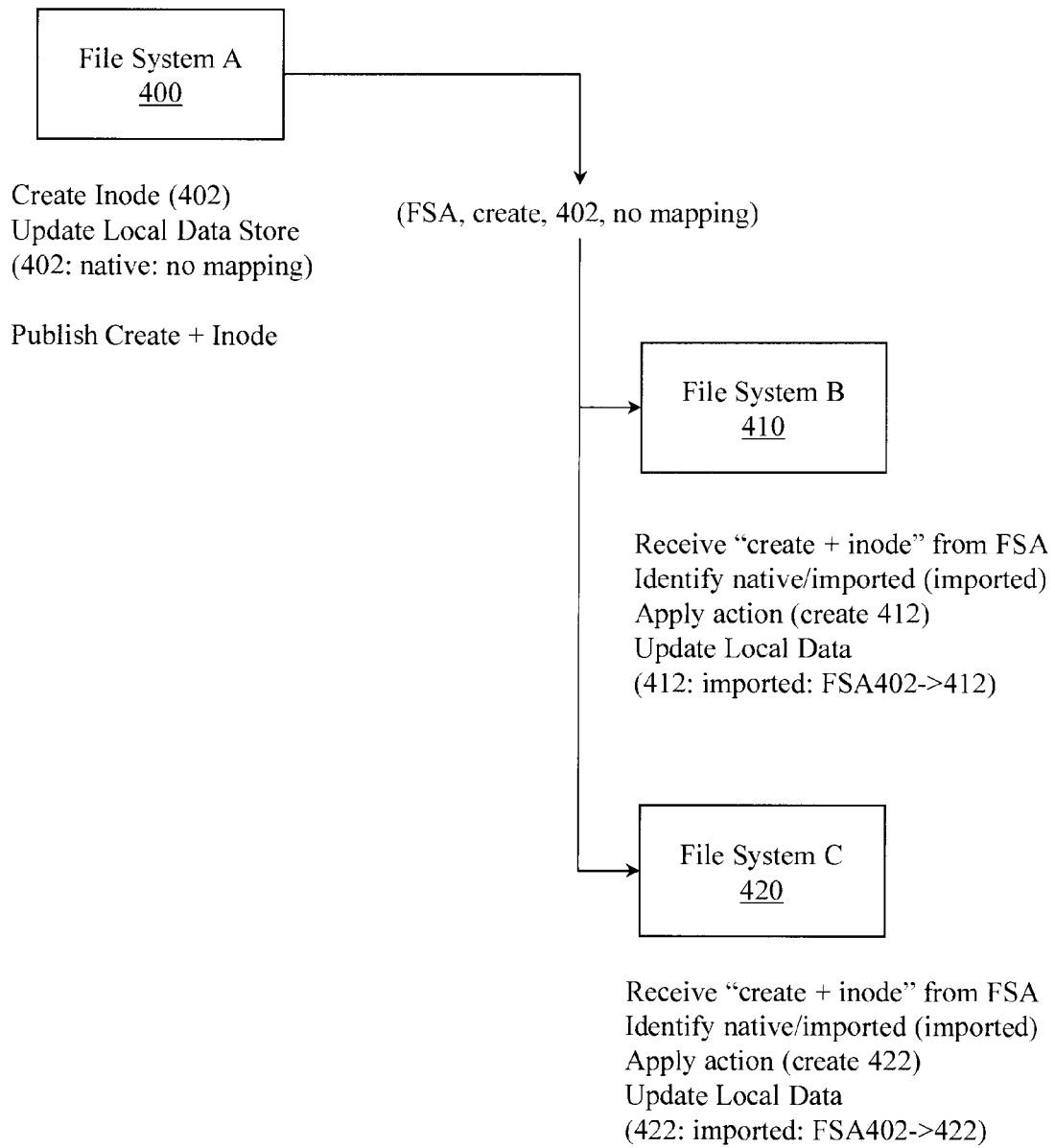
FIG. 4 illustrates an example operation in a local file system being published to an external file system(s).
Figure 5:
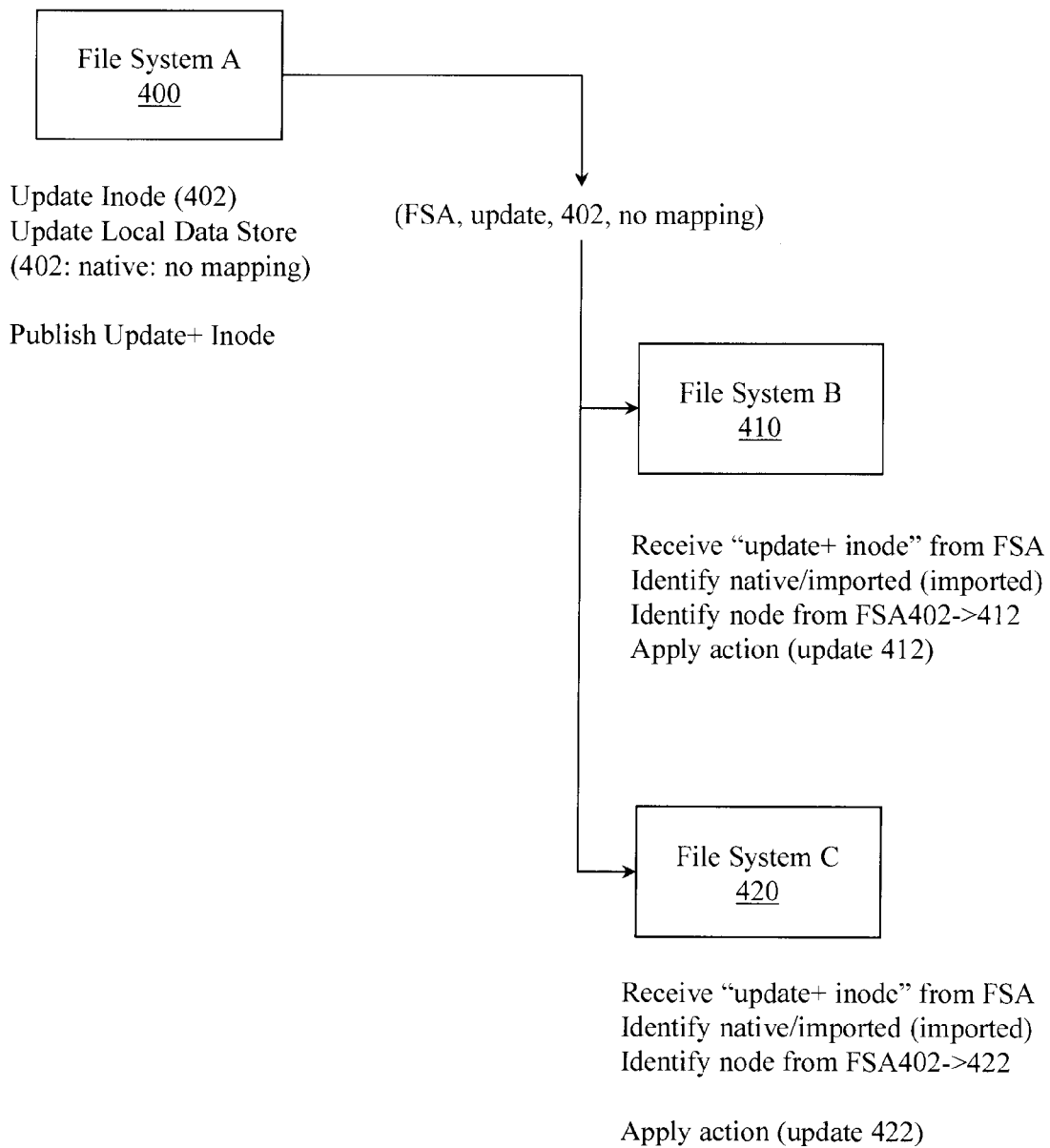
FIG. 5 illustrates an example operation in a local file system being published to an external file system(s).
Figure 6:
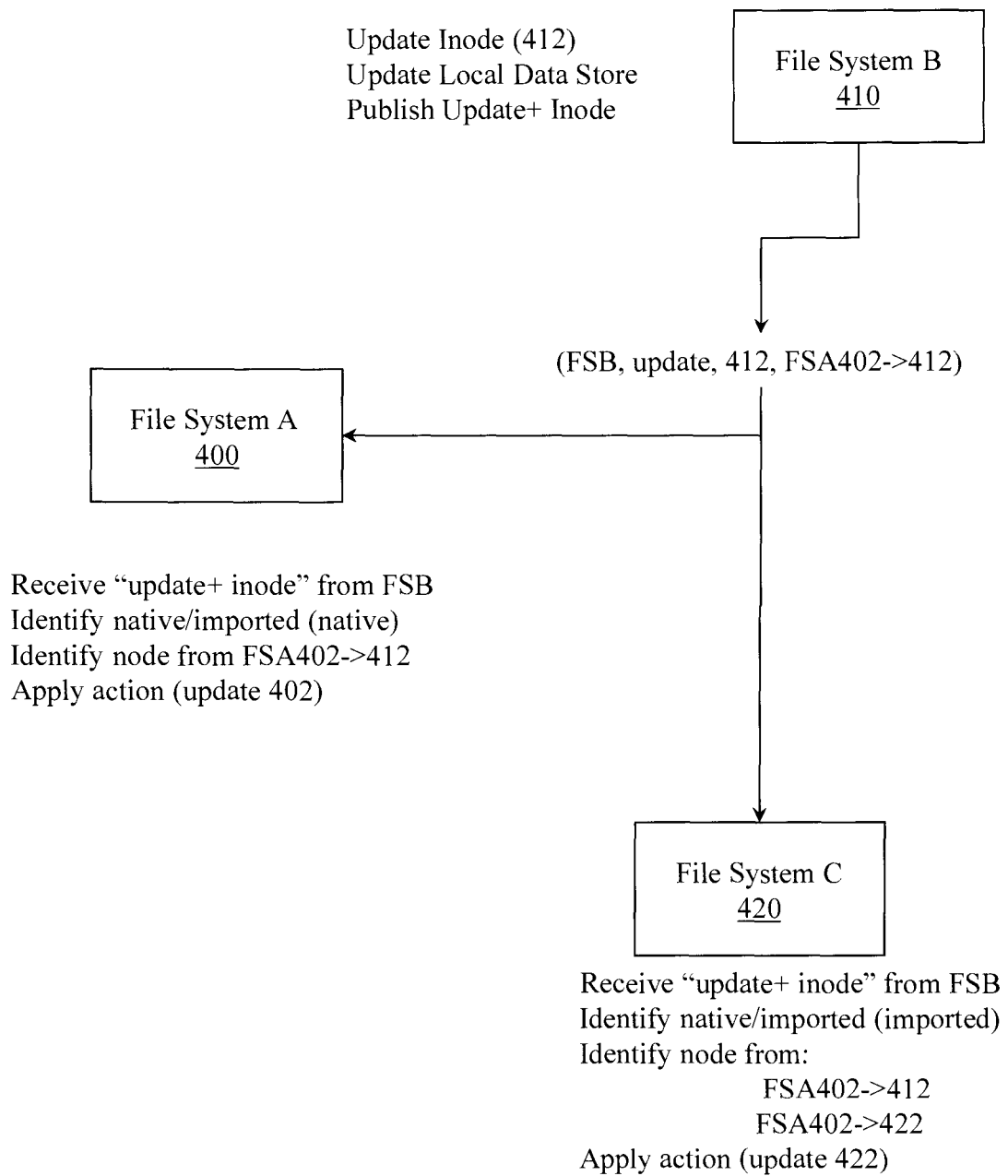
FIG. 6 illustrates an example operation in a local file system being published to an external file system(s).

In one embodiment, the data structure 300 includes an actor's mapping field 340. The actor's mapping field 340 stores information that relates the inode upon which the actor 310 took the action 320 and another inode that is not local to the file system associated with the actor 310. FIGS. 4-6 illustrate the use of the actor's mapping field 340 to help identify inode translation between three different actors. In different embodiments the actor's mapping field 340 may be a bitfield, a character string, an integer, or other data type suitable for computer storage and a computer communication.

FIG. 4 illustrates an example interaction between file systems that use example extended inodes and inode action publication. A first file system (e.g., file system A 400) creates an inode, which is given inode number 402. Inode 402 is the inode number in the originating file system A 400. The number 402 is the local handle in file system A 400 for the file associated with inode 402. After creating inode 402, file system A 400 updates its local data store with the extended inode information (e.g., inode number, native/imported identifier (native), no-mapping). The native/imported identifier indicates that inode 402 is native to the originating file system A 400. Since inode 402 is native to the originating file system A 400, there is no mapping to an external inode in an external file system.

File system A 400 then publishes information about the action taken that affected inode 402. For example, file system A 400 publishes a record (FSA, create, 402, no mapping). The record identifies the actor as file system A 400 (FSA), identifies the action as a create, identifies the inode number local to the actor as inode 402, and indicates there is no mapping. The published information may be received at one or more external file systems. For example, file system B 410 and file system C 420 may receive the published information.

When file system B 410 receives the (FSA, create, 402, no mapping) publication, file system B 410 may parse the publication to identify the actor, the action, and whether the inode acted on was a native or imported inode. If the inode acted on was native to the actor (e.g., FSA 400), then the inode will not be native to the receiving file system B 410. If the inode acted on was imported by the actor, then the inode may or may not be native to the receiving file system B 410. The receiving file system B 410 will identify whether the inode referred to by the publication is native to the receiving file system B 410 and may also identify whether the inode referred to by the publication originated in the receiving file system B 410. In this example, file system B 410 will determine that the inode was native to file system A 400 and was imported into file system B 410. File system B 410 may then apply an action. Since file system A 400 created an inode, file system B 410 may also create an inode. Recall that inodes are local resources to a file system. Therefore, file system B 410 will create its own inode with its own inode number. To facilitate n-way inode translation, file system B 410 will then record a mapping from file system A 400 inode 402 to file system B 410 inode 412. File system B 410 will store the inode number, the origin information, and information that identifies inode 412 as an imported inode in its local data structure. After this work is complete, file system B 410 has its own representation of the file using local inode 412 and has information to refer back to the original inode 402 in the originating file system A 400.

File system C 420 may also receive the publication (FSA, create, 402, no mapping) and may take similar actions. For example, file system C 420 may identify that the inode 402 is native to file system A 400 and was imported to file system C 420. File system C 420 may then create its own local inode (e.g., 422), store information about the inode, the fact that it was imported, and a mapping from file system A 400 inode 402 to file system C 420 inode 422.

FIG. 5 illustrates another example interaction between file systems that use example extended inodes and inode action publication. In FIG. 5, file system A 400 has updated its local inode 402 and published information about the update. In this example, the published information takes the form (FSA, update, 402, no mapping). The published information therefore identifies the actor (FSA), the action (update), the local inode number (402), and a mapping used by the actor to relate the local inode number to an external inode number. Since inode 402 is native to and originated at file system A 400, the publication provides no mapping.

Once again the publication is received at both file system B 410 and file system C 420. File system B 410 receives the publication and parses out the actor, action, inode number and mapping. File system B 410 determines that the inode is native to file system A 400, and is imported into file system B 410. File system B 410 then accesses its local mapping to determine that the inode in file system B 410 that corresponds to inode 402 in file system A 400 is local inode 412. File system B 410 may then apply the update using inode 412. Similarly, file system C 420 receives the publication and parses out the actor, action, inode number and mapping. File system C 420 determines that the inode is native to file system A 400, and is imported into file system C 420. File system C 420 then accesses its local mapping to determine that the inode in file system C 420 that corresponds to inode 402 in file system A 400 is local inode 422. File system C 420 may then apply the update using inode 412.

FIG. 6 illustrates another example interaction between file systems that use example extended inodes and inode action publication. However, in FIG. 6, the action is performed on an inode in a file system that did not originate the original inode. In FIG. 6, file system B 410 updates its local inode 412, updates its local data store, and then publishes the update information. For example, file system B 410 publishes (FSB, update, 412, FSA 402→412). This publication identifies the actor (FSB), the action (update), the local inode number (412), and a mapping that identifies the original inode (402), its originating file system (FSA), and the mapping that exists in file system B 410.

In one embodiment, a receiving file system will perform one of three actions. For a file/inode that does not report that it is imported, the receiving file system may know that the file or inode is coming from its originator. The receiving file system may, therefore, use the originator's local inode number to retrieve information from its local data structure (e.g., inode map) from that originator. For a file/inode that does report that it is imported, the receiving file system accesses inode attributes for the originating file system and inode number. If the receiving file system is the originator, then the receiving file system retrieves the original inode number directly and applies the action using that original inode number. If the receiving file system is not the original, then the receiving file system access its mapping of inodes from the originating file system to determine the origin inode number. Once the origin inode number is known, the receiving file system can then access its own local mapping to identify its own local inode number. The action can then be applied to the local inode number.

Returning now to FIG. 6, File system B 410 has acted on its local inode 412, which corresponds to inode 402 in the originating file system A 400, and which corresponds to local inode 422 in non-originating file system C 420. When originating file system A 400 receives the publication, originating file system A 400 identifies that the inode was imported into file system B 410 but was native to file system A 400. Therefore file system A 400 is able to translate FSB:412 to FSA:402 and to apply the published action to local inode 402. When non-originating file system C 420 receives the publication, non-originating file system C 420 identifies that the inode was imported into file system B 410 and was also imported into file system C 420. Therefore file system C 420 first translates FSB:412 to FSA:402 using the mapping provided in the publication and then translates FSA:402 to FSC:422 using the mapping stored in file system C 420. The action can then be applied to local inode 422 in the receiving file system C 420. Thus, by storing additional information (e.g., native/imported, mapping) in a local file system and by publishing information (e.g., actor, action, inode number, mapping) about actions taken in a local file system, example apparatus and methods provide file systems with their own mappings from remote filesystem/inode pairs to local filesystem/inode pairs, which facilitates a local file system only having to manage its own inode space and mapping without having to manage an external inode space or mapping. Note that updates to the file systems must be processed in order. In the example described, C will process the original create from A first and will have created its local mapping in order to be able to process the update from B.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 7:
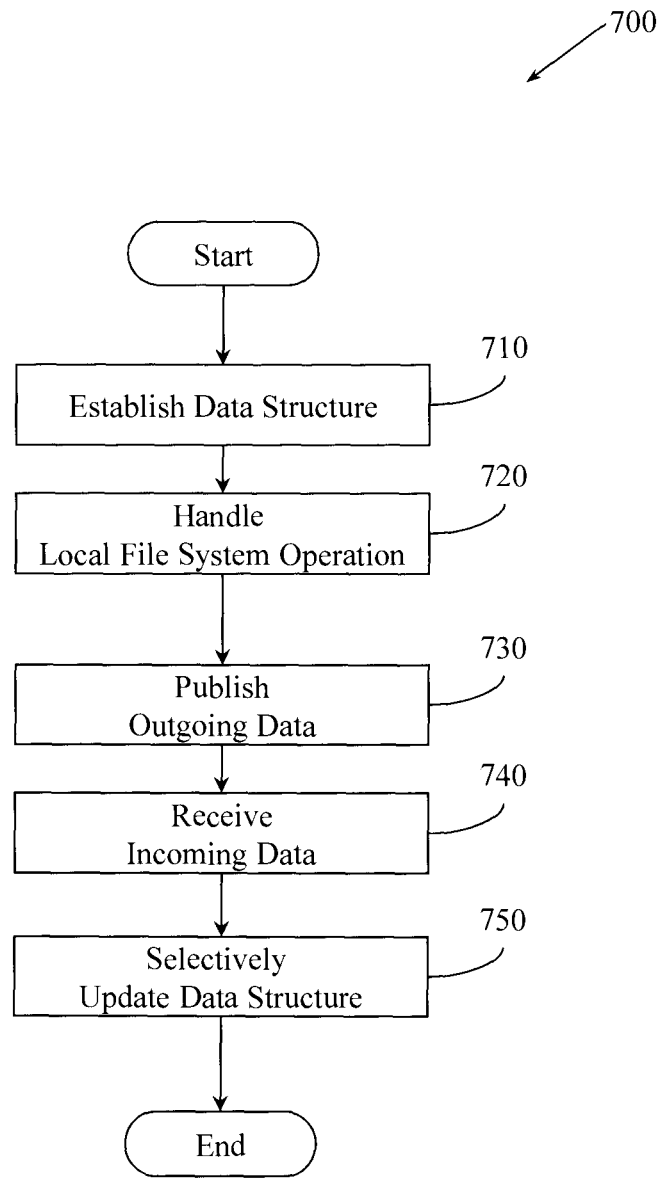
FIG. 7 illustrates an example method associated with n-way inode translation.

FIG. 7 illustrates a method 700 associated with n-way inode translation. Method 700 includes, at 710, establishing a data structure for storing information about an inode. The inode may have originated in a local inode space associated with a local file system or may have originated in an external inode space associated with an external file system. Thus, the information concerning the inode may include information about the file system in which the inode originated. In one embodiment, establishing the data structure includes instantiating an inode table associated with the local inode space. The inode table may include, for example, inode records. In one embodiment, an inode record may include a local inode number, a native/imported indicator, and an internal/external mapping. The native/imported indicator may identify whether the inode associated with the inode record originated in the local inode space or was imported into the local inode space from an external inode space where the inode originated. If the inode originated in an external inode space, the internal/external mapping may store information relating the external inode to an internal inode.

Method 700 also includes, at 720, handling a local file system operation that affects a local inode in the local inode space. The local file system operation may be, for example, a create operation, an update operation, or a delete operation. Handling the local file system operation may include, for example, creating an inode. When an inode is created it may be assigned a local inode number. Recall that inodes are local to a file system.

Method 700 also includes, at 730, publishing outgoing data concerning the local file system operation and the local inode. Publishing outgoing data facilitates providing information from which external file systems can maintain their own data structures that store mappings about inodes. In one embodiment, the outgoing data may include information concerning a file system that acted on a target inode, an action taken by the file system on the target inode, an identifier of the target inode, and an internal/external mapping associated with the target inode. In different embodiments, additional information may be published and the order of the published information may vary.

Method 700 also includes, at 740, receiving incoming data concerning an external file system operation and an external inode. The external file system operation may be, for example, a create operation, an update operation, or a delete operation. Like the outgoing information provides information about a local operation that affected a local inode, the incoming information provides information about an external operation that affected an inode local to the external file system. Thus, in one example, the incoming data includes information concerning a file system that acted on a target inode, an action taken by the file system that acted on the target inode, an identifier of the target inode, or an internal/external mapping associated with the target inode. In one embodiment, the internal/external mapping stores information relating the inode in the local inode space and the inode in the external inode space.

Method 700 also includes, at 750, in response to handling the local file system operation or receiving the incoming data, selectively updating the data structure. Updating the data structure may include establishing or updating a mapping between an inode in the local inode space and an inode in the external inode space. The mapping facilitates performing n-way translation, where n is an integer greater than one.

Receiving the incoming data may trigger different actions depending on where the inode associated with the incoming data originated. In one embodiment, upon determining that the external inode is associated with an inode that originated in the local inode space, receiving the incoming data may include using local inode space information to support a local file system action. Upon determining that the external inode is associated with an inode that did not originate in the local inode space, then receiving the information may include using local inode space information to locate and resolve a mapping between the external inode and an internal inode. The information found in the mapping may in turn provide information for supporting a local file system action.

In one example, a method may be implemented as computer executable instructions. Thus, in one example, a computer-readable medium may store computer executable instructions that if executed by a machine (e.g., processor) cause the machine to perform method 700. While executable instructions associated with method 700 are described as being stored on a computer-readable medium, it is to be appreciated that executable instructions associated with other example methods described herein may also be stored on a computer-readable medium.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
SSD: solid state drive
SAN: storage area network.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Figure 8:
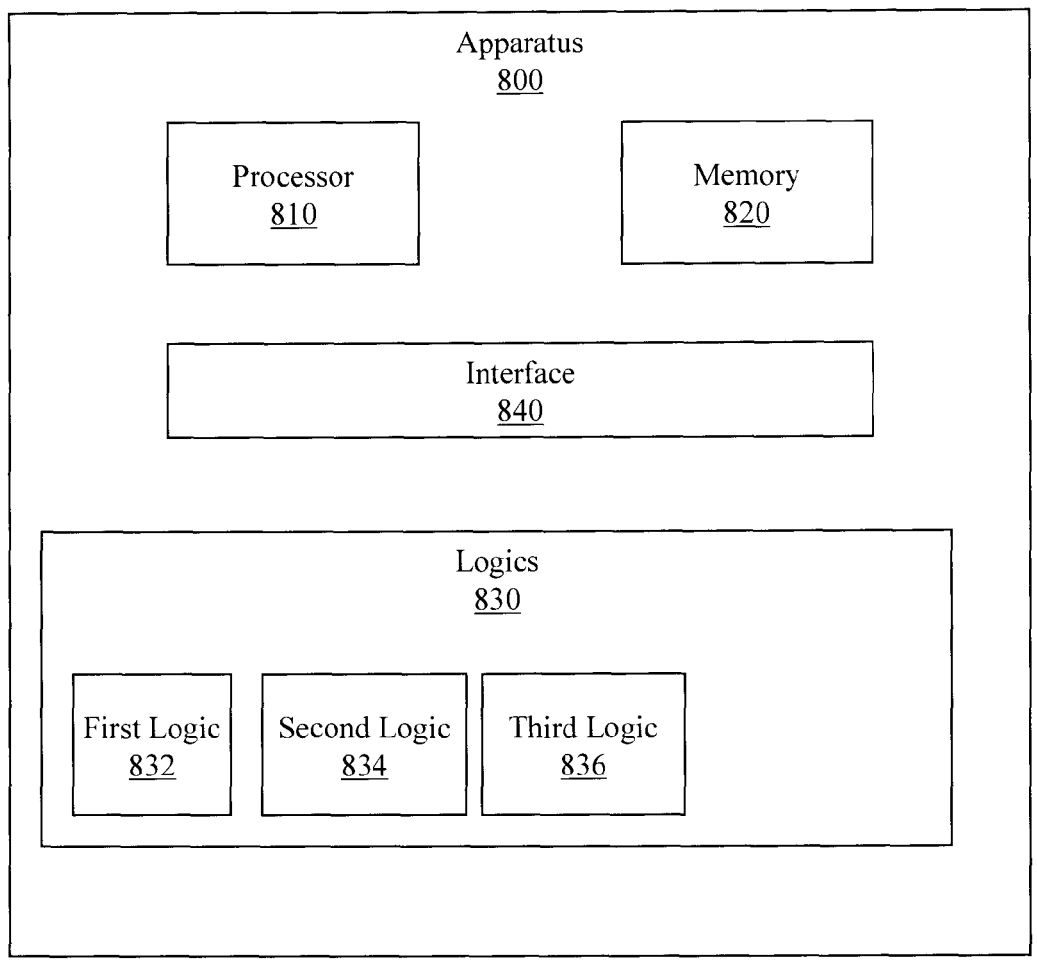
FIG. 8 illustrates an example apparatus configured to participate in n-way inode translation.

FIG. 8 illustrates an apparatus 800 that supports n-way inode translation. Apparatus 800 includes a processor 810, a memory 820, and a set 830 of logics that is connected to the processor 810 and memory 820 by an interface 840. The memory 820 may be configured to store information about a local inode space associated with a local file system. The information may identify an inode that originated in the local inode space. The information may also identify an external inode that originated in an external inode space. Since information about two different inode spaces is available, the memory may also store information that identifies a mapping between inodes that originated in the external inode space and corresponding local inodes.

The set 830 of logics may include a first logic 832 that is configured to provide an outgoing action report concerning an internal action that affected an inode in the internal inode space. In one embodiment, the first logic 832 may be configured to populate the outgoing action report with information identifying a file system associated with the internal inode space. The file system may be viewed as the actor that performed the action on the inode. The outgoing action report may also include information identifying the internal action that was performed. The internal action may be, for example, creating an inode, updating an inode, deleting an inode, or other action that caused an inode to change. Since inodes are local to file systems, the outgoing action report may include information identifying the inode in the internal inode space. Since example methods and apparatus support n-way inode translation by storing mappings locally in a file system, the outgoing action report may also include information identifying a relationship between the inode in the internal inode space and a member of an external inode space. When the inode originated in the local inode space, there may be no mapping to an external inode. When the inode originated outside the local inode space, there may be a mapping to an external inode.

The apparatus 800 may also include a second logic 834 that is configured to receive an incoming action report concerning an external action that affected an inode in the external inode space. In one embodiment, second logic 834 is configured to retrieve information from the incoming action report. The information retrieved from the incoming action report may include, for example, information identifying a file system in which the external action was taken and information identifying the external action. Since inodes are local resources that are local to file systems, the incoming action report may also include information identifying the external inode. Example apparatus and methods maintain mappings locally inside file systems, and thus the incoming action report may include information identifying a relationship between a member of the internal inode space and the external inode.

Figure 9:
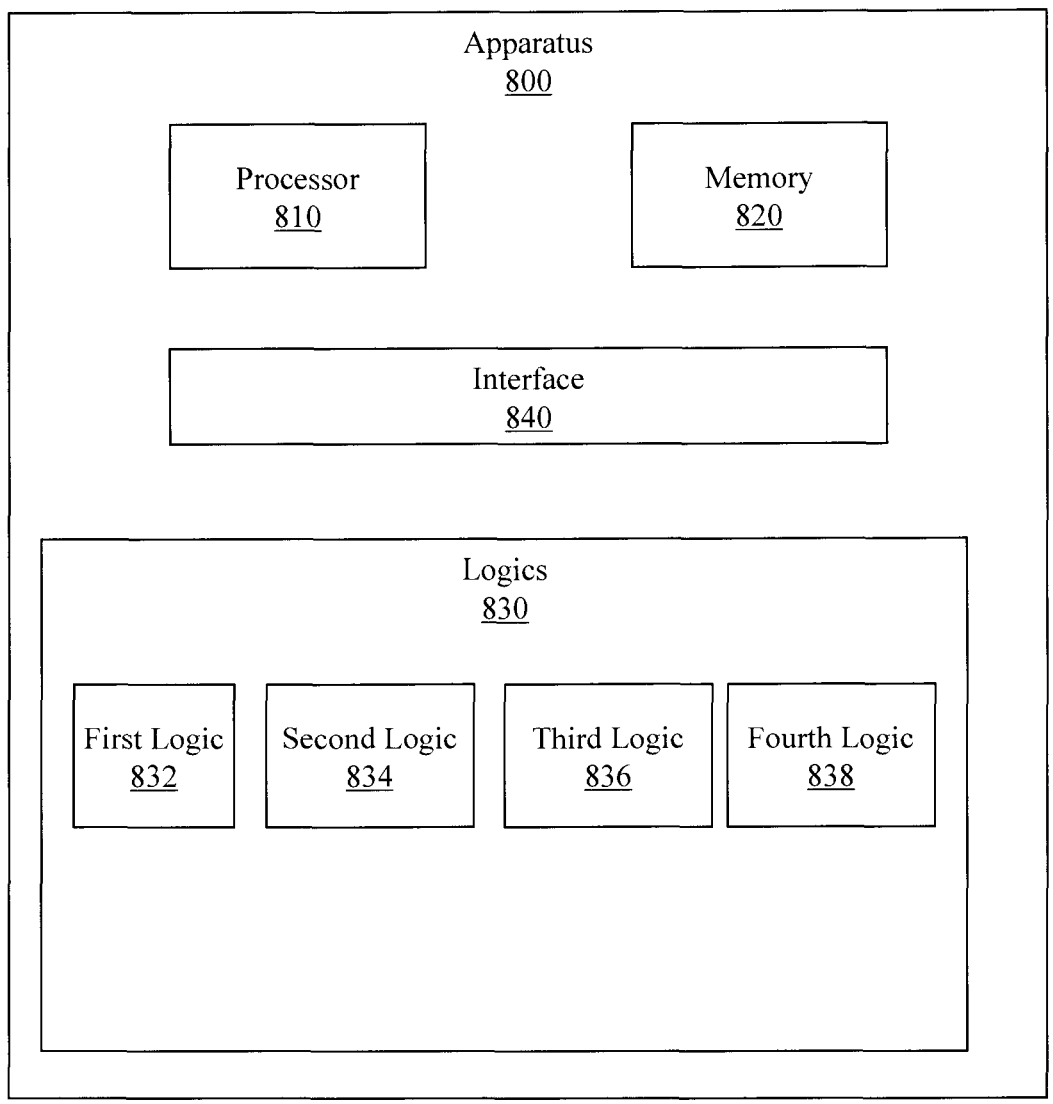
FIG. 9 illustrates an example apparatus configured to participate in n-way inode translation.

FIG. 9 illustrates another embodiment of apparatus 800. This embodiment includes a third logic 836. The third logic 836 may be configured to maintain a mapping between a first inode in the internal inode space and a corresponding second inode in the external inode space. The mapping may be maintained in different ways. For example, a table from which correlations may be made may store the mapping. In another example, a linked list or other data structure may be employed. In one example, mappings may be stored in a relational database table that is accessible to the file system.

Inodes may originate in different inode spaces. The incoming action report may identify the inode space in which an inode was touched and may also provide information from which the inode space in which the inode originated may be identified. Thus, the third logic 836 may be configured to resolve an address associated with the external inode using information from the internal inode space. This approach may be taken upon determining that the external inode originated in the internal inode space. The third logic 836 may also be configured to resolve an address associated with the external inode using information that originated outside the internal inode space. This approach may be taken upon determining that the external inode originated outside the internal inode space.

In one embodiment, the memory 820 may be configured to store the information about the local inode space in a record. The record may include, for example, a local inode number, an indicator that identifies whether the inode associated with the local inode number originated in the local inode space, and a mapping from a native inode number to an external inode number. In one embodiment, the memory 820 may not store the mapping but instead may store information for accessing the mapping or a set of mappings.

Figure 10:
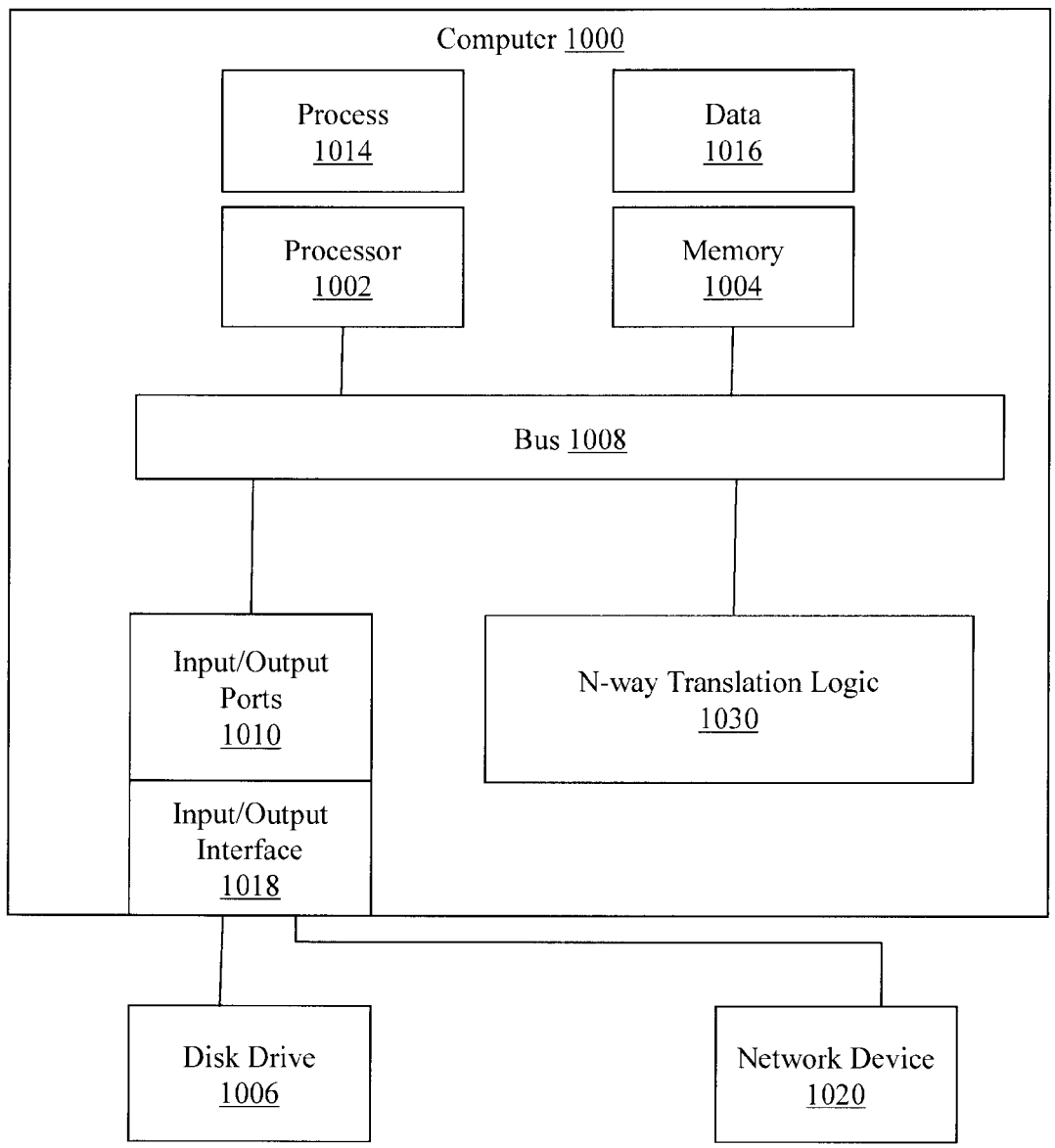
FIG. 10 illustrates an example apparatus configured to participate in n-way inode translation.

FIG. 10 illustrates an example computing device in which example systems and methods described herein, and equivalents, may operate. The example computing device may be a computer 1000 that includes a processor 1002, a memory 1004, and input/output ports 1010 operably connected by a bus 1008. In one example, the computer 1000 may include an n-way translation logic 1030 configured to maintain a mapping data structure in an extended inode. The n-way translation logic 1030 may also publish and receive information about inode operations in different inode spaces. In different examples, the logic 1030 may be implemented in hardware, software, firmware, and/or combinations thereof. While the logic 1030 is illustrated as a hardware component attached to the bus 1008, it is to be appreciated that in one example, the logic 1030 could be implemented in the processor 1002.

Thus, logic 1030 may provide means (e.g., hardware, software, firmware) for exporting first information from a first file system. The first information may describe a first file system operation performed in the first file system. The first information may also describe a first inode that was affected by the first file system operation. Thus, logic 1030 may provide means for publishing or providing information about a file system actor, a file system action, and an inode that was the object of the file system action. Providing information is just part of the processing performed by example apparatus and methods. Thus, logic 1030 may also provide means (e.g., hardware, software, firmware) for receiving second information into the first file system. The second information may describe a second file system operation performed in a second file system and a second inode that was affected by the second file system operation.

Since logic 1030 publishes information about a local file system and receives information about external file systems, logic 1030 may also provide means for maintaining a mapping between a local inode associated with the first file system and a remote inode associated with the second file system. Maintaining the mapping may facilitate maintaining consistency between the local inode and the remote inode. The consistency may be maintained using the first information and the second information.

The means associated with logic 1030 may be implemented, for example, as an ASIC that implements the functionality of apparatus described herein. The means may also be implemented as computer executable instructions that implement the functionality of methods described herein and that are presented to computer 1000 as data 1016 that are temporarily stored in memory 1004 and then executed by processor 1002.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, PROM, and other memory. Volatile memory may include, for example, RAM, SRAM, DRAM, and other memory.

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a flash memory card, a memory stick, or other device. Furthermore, the disk 1006 may be a CD-ROM drive, a CD-R drive, a CD-RW drive, a DVD ROM drive, a Blu-Ray drive, an HD-DVD drive, or other device. The memory 1004 can store a process 1014 and/or a data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., PCIE, 1394, USB, Ethernet). The bus 1008 can be types including, for example, a memory bus, a memory controller, a peripheral bus, an external bus, a crossbar switch, and/or a local bus.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and other devices. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause the computer to perform a method, the method comprising:

establishing a data structure for storing information about an inode, where the inode originated in a local inode space associated with a local file system or originated in an external inode space associated with an external file system, where establishing the data structure includes instantiating an inode table associated with the local inode space, where the inode table includes one or more inode records, and where an inode record comprises a local inode number, a native/imported indicator, and an internal/external mapping;

handling a local file system operation that affects a local inode in the local inode space;

publishing outgoing data concerning the local file system operation and the local inode, where the outgoing data includes information concerning a file system that acted on a target inode, an action taken by the file system on the target inode, an identifier of the target inode, and, upon determining that the local inode is not native to or did not originate from the local file system:

an internal/external mapping associated with the target inode, where the information concerning the file system that acted on the target inode includes information that identifies the file system that acted on the target inode, that identifies a local inode space associated with the target inode, or information that identifies the source of the outgoing data;

receiving incoming data concerning an external file system operation and an external inode; and in response to handling the local file system operation or receiving the incoming data, selectively updating the data structure with a mapping between an inode in the local inode space and an inode in the external inode space.

2. The non-transitory computer-readable medium of claim 1, where the local file system operation is a create operation, an update operation, or a delete operation.

3. The non-transitory computer-readable medium of claim 1, where the external file system operation is a create operation, an update operation, or a delete operation.

4. The non-transitory computer-readable medium of claim 1, where the native/imported indicator identifies whether the inode associated with the inode record originated in the local inode space or was imported into the local inode space from an external inode space where the inode originated.

5. The non-transitory computer-readable medium of claim 1, where the internal/external mapping stores information relating the inode in the local inode space and the inode in the external inode space.

6. The non-transitory computer-readable medium of claim 1, where the incoming data includes information concerning a file system that acted on a target inode, an action taken by the file system that acted on the target inode, an identifier of the target inode, and an internal/external mapping associated with the target inode.

7. The non-transitory computer-readable medium of claim 6, where receiving incoming data concerning the external file system operation and the external inode includes:

upon determining that the external inode is associated with an inode that originated in the local inode space, using local inode space information to perform a local file system action.

8. The non-transitory computer-readable medium of claim 7, where receiving incoming data concerning the external file system operation and the external inode includes:

upon determining that the external inode is associated with an inode that did not originate in the local inode space, using local inode space information to locate and resolve a mapping that provides information for performing a local file system action.

9. An apparatus, comprising:

a processor;

a memory that stores information about a local inode space associated with a local file system, where the information identifies an inode that originated in the local inode space, where the information identifies an external inode that originated in an external inode space, and where the information identifies a mapping for the inode that originated in the external inode space to a corresponding local inode, where the memory stores the information about the local inode space in a record that includes a local inode number, an indicator that identifies whether the inode associated with the local inode number originated in the local inode space, and a mapping from a native inode number to an external inode number;

a set of logics; and an interface that connects the processor, the memory, and the set of logics;

the set of logics comprising:

a first logic that provides an outgoing action report concerning an internal action that affected an inode in the internal inode space where the first logic populates the outgoing action report with information identifying a file system associated with the internal inode space, information identifying the internal action, information identifying the inode in the internal inode space upon which the file system performed the internal action, information identifying a relationship between the inode in the internal inode space and a member of an external inode space, information that identifies a source of the outgoing action report, and, upon determining that the inode did not originate in the local inode space, an internal/external mapping associated with the inode; and a second logic that receives an incoming action report concerning an external action that affected an inode in the external inode space.

10. The apparatus of claim 9, where the second logic retrieves from the incoming action report information identifying a file system in which the external action was taken, information identifying the external action, information identifying the external inode, information identifying a relationship between a member of the internal inode space and the external inode, and information that identifies a source of the incoming action report.

11. The apparatus of claim 10, comprising a third logic that maintains a mapping between a first inode in the internal inode space and a corresponding second inode in the external inode space.

12. The apparatus of claim 11, where the third logic resolves an address associated with the external inode using information from the internal inode space upon determining that the external inode originated in the internal inode space.

13. The apparatus of claim 12, where the third logic resolves an address associated with the external inode using information that originated outside the internal inode space upon determining that the external inode originated outside the internal inode space.

14. The apparatus of claim 9, where the memory stores the information about the local inode space in a record that includes a local inode number, an indicator that identifies whether the inode associated with the local inode number originated in the local inode space, and a mapping from a native inode number to an external inode number.

15. A system, comprising:
means for exporting from a first file system first information describing a first file system operation performed in the first file system and a first inode that was affected by the first file system operation, where the first file system first information includes a local inode number, a native/imported indicator, information that identifies a source of the first file information and, upon determining that the first inode is not native to and did not originate from the first file system, an internal/external mapping; and means for receiving into the first file system second information describing a second file system operation performed in a second file system and a second inode that was affected by the second file system operation, where the first file system second information includes a local inode number, a native/imported indicator, an internal/external mapping, and information that identifies a source of the first file system second information.

16. The system of claim 15, comprising:
means for maintaining a mapping between a local inode associated with the first file system and a remote inode associated with the second file system, and means for maintaining consistency between the local inode and the remote inode based, at least in part, on the first information and the second information.

\* \* \* \* \*